(12) United States Patent
Groh et al.

(10) Patent No.: US 12,661,991 B2
(45) Date of Patent: Jun. 23, 2026

(54) VEHICLE ELECTRICAL SYSTEM AND METHOD FOR THE OPERATION THEREOF

(71) Applicants: AUDI AG, Ingolstadt (DE); DR. ING. H.C.F. Porsche AG, Stuttgart (DE)

(72) Inventors: Thorsten Groh, Enzklösterle (DE); Martin Schneider, Großmehring (DE); Tihomir Tomanic, Pfinztal (DE)

(73) Assignees: AUDI AG, Ingolstadt (DE); DR. ING. H.C.F. PORSCHE AG, Stuttgart (DE)

( * ) Notice: Subject to any disclaimer, the term of this patent is extended or adjusted under 35 U.S.C. 154(b) by 0 days.

(21) Appl. No.: 18/580,823

(22) PCT Filed: Jul. 21, 2022

(86) PCT No.: PCT/EP2022/070496
§ 371 (c)(1),
(2) Date: Jan. 19, 2024

(87) PCT Pub. No.: WO2023/001968
PCT Pub. Date: Jan. 26, 2023

(65) Prior Publication Data
US 2025/0091536 A1 Mar. 20, 2025

(30) Foreign Application Priority Data

Jul. 21, 2021 (DE) ..................... 10 2021 118 869.5

(51) Int. Cl.
*B60L 3/00* (2019.01)
*B60L 1/00* (2006.01)
(Continued)

(52) U.S. Cl.
CPC .............. *B60L 3/0092* (2013.01); *B60L 1/00* (2013.01); *B60R 16/033* (2013.01);
(Continued)

(58) Field of Classification Search
CPC ......... B60R 16/03; B60R 16/033; B60L 1/00; B60L 3/0092; B60L 2210/10;
(Continued)

(56) References Cited

U.S. PATENT DOCUMENTS

| | | | | |
|---|---|---|---|---|
| 2011/0273809 | A1* | 11/2011 | Falsett | H01M 10/0525 361/103 |
| 2017/0113637 | A1* | 4/2017 | Mueller | B60R 16/03 |

FOREIGN PATENT DOCUMENTS

| | | |
|---|---|---|
| CN | 105934860 A | 9/2016 |
| CN | 109130862 A | 1/2019 |

(Continued)

OTHER PUBLICATIONS

English Translation by WIPO dated Feb. 1, 2024 of the International Preliminary Report on Patentability in corresponding International Patent Application No. PCT/EP2022/070496.
(Continued)

*Primary Examiner* — Ryan Johnson
(74) *Attorney, Agent, or Firm* — STAAS & HALSEY LLP

(57) ABSTRACT

In a method for operating a vehicle electrical system for a motor vehicle, a vehicle battery of the vehicle electrical system that has at least two sub-batteries provides electrical energy from more than one of the at least two sub-batteries at a conventional supply terminal of the vehicle electrical system, the conventional supply terminal being electrically coupled to the vehicle battery. At least a first and a second safety supply terminal of the vehicle electrical system are supplied with electrical energy by a coupling device of the vehicle electrical system, the coupling device being connected to the vehicle battery, and the coupling device electrically coupling the at least a first and second safety supply terminal each to exactly one of the at least two sub-batteries in accordance with a coupling state of the coupling device.

18 Claims, 8 Drawing Sheets

(51) Int. Cl.

| | |
|---|---|
| *B60R 16/033* | (2006.01) |
| *B60W 50/023* | (2012.01) |
| *B60W 50/029* | (2012.01) |
| *H02J 7/50* | (2026.01) |

(52) U.S. Cl.
CPC ............. *B60W 50/023* (2013.01); *H02J 7/50* (2026.01); *B60T 2270/414* (2013.01); *B60W 2050/0292* (2013.01)

(58) Field of Classification Search
CPC .............. H02J 2310/48; H02J 2310/46; H02J 2310/40; B60T 2270/414; B60T 2270/402; B60W 50/023; B60W 60/0015; B60W 2050/0292
See application file for complete search history.

(56) References Cited

FOREIGN PATENT DOCUMENTS

| | | | |
|---|---|---|---|
| CN | 110301083 A | 10/2019 | |
| DE | 10 2005 004 330 A1 | 8/2006 | |
| DE | 102005039104 A1 * | 2/2007 | ............... B60L 1/00 |
| DE | 10 2005 038 746 A1 | 3/2007 | |
| DE | 10 2012 003 309 A1 | 8/2013 | |
| DE | 10 2013 225 020 A1 | 6/2015 | |
| DE | 10 2014 201 360 A1 | 7/2015 | |
| DE | 10 2015 200 124 A1 | 7/2016 | |
| DE | 102017218252 A1 * | 4/2019 | ........... B60R 16/033 |
| DE | 10 2018 100 746 A1 | 7/2019 | |
| DE | 10 2019 007 956 A1 | 4/2021 | |
| EP | 3 530 513 A1 | 8/2019 | |
| EP | 3 616 974 A1 | 3/2020 | |
| WO | 2018/163751 A1 | 9/2018 | |

OTHER PUBLICATIONS

International Search Report dated Nov. 18, 2022 for International Application No. PCT/EP2022/070496.
German Office Action dated May 25, 2022 for German Application No. 10 2021 118 869.5.
PCT/EP2022/070496, Jul. 21, 2022, Thorsten Groh, AUDI AG.
10 2021 118 869.5, Jul. 21, 2021, Thorsten Groh, AUDI AG.
Chinese Office Action dated Mar. 31, 2026 for Chinese Application No. 202280051350.0.

* cited by examiner

VEHICLE ELECTRICAL SYSTEM AND METHOD FOR THE OPERATION THEREOF

CROSS REFERENCE TO RELATED APPLICATIONS

This application is a U.S. national stage of International Application No. PCT/EP2022/070496, filed on Jul. 21, 2022. The International Application claims the priority benefit of German Application No. 10 2021 118 869.5 filed on Jul. 21, 2021. Both the International Application PCT/EP2022/070496 and the German Application 10 2021 118 869.5 are incorporated by reference herein in their entirety.

BACKGROUND

Disclosed herein is a vehicle electrical system for a motor vehicle, with a vehicle battery comprising at least two sub-batteries as well as at least one conventional supply terminal electrically coupled to the vehicle battery such that the vehicle battery provides electrical energy from more than one of the at least two sub-batteries on at least one conventional supply terminal. Moreover, disclosed herein is a motor vehicle with a vehicle electrical system. Also disclosed herein is a method for operating a vehicle electrical system for a motor vehicle, in which electrical energy is provided from a vehicle battery of the vehicle electrical system, which comprises at least two sub-batteries, at a conventional supply terminal of the vehicle electrical system electrically coupled to the vehicle battery from more than one of the at least two sub-batteries.

Generic vehicle electrical systems, motor vehicles with generic vehicle electrical systems as well as methods for the operation thereof are extensively known in the prior art such that a separate printed evidence is not required for this reason. In a motor vehicle, the vehicle electrical system serves to be able to distribute electrical energy between electrical devices connected with the vehicle electrical system on at least one supply terminal. The supply terminal can be a local place of the vehicle electrical system, which can be arranged in a specific position in the motor vehicle. However, the vehicle electrical system can also be arranged distributed over the motor vehicle such that the conventional supply terminal can also comprise more than only one single connection place for connecting electrical devices. The connection places can be arranged distributed in the motor vehicle.

Moreover, the vehicle electrical system comprises at least one vehicle battery, which serves for providing electrical energy. Presently, providing electrical energy does not only mean delivering electrical energy to electrical devices of the vehicle electrical system or to electrical devices connected with the vehicle electrical system, but it also includes receiving electrical energy, for example if in an electrically drivable motor vehicle in a braking operation, within the scope of a recuperation, movement energy is converted into electrical energy by means of a corresponding electrical device and supplied to the vehicle electrical system. Of course, this similarly also applies to the term "supplying". A vehicle electrical system of a generic type is for example disclosed in DE 10 2014 201 360, DE 10 2012 003 309 A1, which discloses an electrical energy system in a motor vehicle and a method for operating an energy system, as well as DE 10 2005 038 746 A1, which discloses a method and a device for voltage supply in a motor vehicle.

Nowadays, it is usual that motor vehicles are equipped with steering and/or braking systems, which at least partially assist the driver of the motor vehicle in critical drive situations. Such steering and/or braking systems often use electrical energy, wherein an immediate action of the driver is no longer required. However, if an error in such a steering and/or braking system or in an energy supply of one of these systems occurs herein, a mechanic or hydraulic fallback level is provided to further allow the steerability and/or braking capability of the motor vehicle to the driver.

The increasing automation of driving, in particular with respect to automated driving, in particular highly automated driving (HAF), allows providing novel concepts for interiors of future motor vehicles, in which occupants of the motor vehicle can occupy very different positions, in particular also the driver. Thus, it can for example be provided that a sleeping position or a rotation of a seat are allowed. However, this also requires new concepts with respect to for example steering and/or braking systems, because mechanic and hydraulic control means, respectively, are possibly no longer reachable for the driver on the one hand, or an automated, in particular autonomous drive of the motor vehicle is for example to be able to be effected independently of a driver action. In such systems, only a purely electrical or electronic connection is then usually present, for example between a sensor on the one hand, such as for example a steering wheel or a brake pedal, and an actuator on the other hand, for example a steering motor, a braking motor or the like. This is also called X-by-wire. Thus, highly available vehicle systems are required, which require a safe electrical energy supply for the intended operation and comply with the requirement to the highest safety standard according to Automotive Safety Integrity Level D (ASIL D according to ISO 26262) as well as associated laws such as for example ECE R 13, ECE R 79 for steer-by-wire.

Therefore, it is required in the prior art to direct particular attention to the electrical energy supply of the systems, in particular the safety-relevant systems. Therein, it becomes apparent that it is not sufficient to provide only two redundant energy supply paths. Thus, upon occurrence of a short circuit, a redundant energy supply path can for example also be affected by reaction such that an intended operation of the safety-relevant system can possibly no longer be ensured. Further such problems either cannot be caught by the known prior art. Therefore, the prior art is not suitable for a corresponding safe and reliable energy supply as it is in particular required for autonomously driving a motor vehicle.

SUMMARY

An aspect of the invention deals with the object of improving the reliability of the energy supply in particular for an autonomous operation of a motor vehicle.

With respect to a generic vehicle electrical system, in an aspect of the invention, the vehicle electrical system comprises a coupling device connected with the vehicle battery as well as at least a first and a second safety supply terminal, wherein the safety supply terminals are connected with the coupling device, wherein the coupling device is configured to electrically couple the at least one first and second safety supply terminal each to exactly one of the at least two sub-batteries depending on a coupling state of the coupling device.

For a generic vehicle electrical system, in another aspect of the invention, the vehicle electrical system comprises a coupling device connected with the vehicle battery as well as at least a first and a second safety supply terminal, which are connected with the coupling device, wherein the coupling device comprises a third connection switching element and is configured to electrically couple the one first or second safety supply terminal to one of the at least two sub-batteries depending on a coupling state of the coupling device and to electrically couple the respectively at least one other of the safety supply terminals to the conventional supply terminal via the third supply switching element depending on a switching state of the third supply switching element.

In a further aspect of the invention, a generic motor vehicle comprises a vehicle electrical system according to the invention.

With respect to a generic method, in an aspect of the invention, at least a first and a second safety supply terminal of the vehicle electrical system are supplied with electrical energy via a coupling device of the vehicle electrical system connected with the vehicle battery, wherein the coupling device electrically couples the at least one first and second safety supply terminal each to exactly one of the at least two sub-batteries depending on a coupling state of the coupling device.

In a further aspect of the invention, in a generic method, a first or a second safety supply terminal of the vehicle electrical system is supplied with electrical energy via a coupling device of the vehicle electrical system connected with the vehicle battery, wherein the coupling device electrically couples the first or the second safety supply terminal to one of the at least two sub-batteries depending on a coupling state of the coupling device and electrically couples the respectively at least one other of the safety supply terminals to the conventional supply terminal via a third connection switching element depending on a switching state of the third connection switching element of the coupling device.

Among other things, aspects of the invention are based on the idea that a partitioned energy storage, in particular the vehicle battery comprising at least two sub-batteries allows new safety concepts. Within the scope of the partitioning, sub-batteries can be formed, which each include at least one individual battery cell. However, each of the sub-batteries may include a plurality of battery cells, which can be connected in series and/or in parallel according to requirement and function. With respect to the battery cells and the interconnection thereof, the sub-batteries can be substantially identically formed. However, this is not necessarily required. According to requirement, the sub-batteries can also comprise numbers of battery cells deviating from each other. The same basically also applies to the interconnection of the battery cells within the respective sub-batteries. The sub-batteries can also be connected in parallel and/or also in series within the vehicle battery. However, a series connection may be provided.

The vehicle battery may be formed to reversibly electrochemically store electrical energy. For example, it can be a high-voltage battery. High voltage presently means an electrical DC voltage, which is greater than about 60 V. For example, high voltage corresponds to the standard ECE R 100 or the like. The vehicle electrical system is, for example, a DC voltage system, which is supplied with the DC voltage. However, the vehicle electrical system does not have to be supplied with a single DC voltage. The vehicle electrical system can be supplied with a high-voltage DC voltage on the one hand and with a low-voltage on-board voltage on the other hand. Herein, the term low voltage means an electrical DC voltage, which is less than a high voltage. However, the invention is not restricted to the fact that at least one of the DC voltages is a high voltage. It can also be provided that both DC voltages are low voltages or else high voltages.

The vehicle battery is electrically coupled to the conventional supply terminal and provides electrical energy from more than one of the at least two sub-batteries at it. For example, an electrical voltage is provided at the conventional supply terminal, which corresponds to the series connection of a plurality of the sub-batteries, for example, all of the sub-batteries. Therefore, the conventional supply terminal is, for example, supplied with an electrical voltage, which corresponds to the rated voltage of the vehicle battery. However, it can basically also be provided that the conventional supply terminal is electrically coupled to the vehicle battery via a DC voltage converter. The DC voltage converter or energy converter is, for example, a constituent of the coupling device. Thereby, it is possible to be able to adequately adjust the electrical voltage at the conventional supply terminal deviating from the rated voltage of the vehicle battery.

The energy converter can be configured as a unidirectional energy converter, which only allows an energy flow from the vehicle battery to electrical devices connected with the conventional supply terminal. However, it may be configured as a bidirectional energy converter such that an inverse energy flow from one or more of the electrical devices, which are connected with the conventional supply terminal, to the vehicle battery is also allowed.

The vehicle battery may be a lithium ion battery, that is a battery, the battery cells of which are based on a corresponding cell chemistry. However, the invention is not restricted hereto. Similarly, other cell chemistries can also be used for realizing the invention, for example lead-acid, nickel-cadmium and/or the like.

Among other things, aspects of the invention are based on the further idea that individual electrical devices, in particular electrical loads or also complete energy supply systems, can be supplied with electrical energy from at least two redundantly provided energy sources. These energy sources can be realized by different sub-batteries of the vehicle battery. By the vehicle electrical system configured according to the invention, reactions between the electrical devices and energy sources, respectively, can be largely avoided. For this purpose, the coupling device connected with the vehicle battery as well as the at least two safety supply terminals are provided. The safety supply terminals are in turn connected with the coupling device.

According to the first aspect, the coupling device is configured to electrically couple the at least one first and second safety supply terminal each to exactly one of the at least two sub-batteries depending on a coupling state of the coupling device. For this purpose, it can be provided that each of the at least two safety supply terminals is electrically coupled to a different sub-battery. However, it can moreover also be provided that at least two of the at least two safety supply terminals are electrically coupled to exactly the same sub-battery. The safety supply terminals are thus provided in addition to the at least one conventional supply terminal.

Such electrical devices may be connected with the safety supply terminals, the operation of which is substantially indispensable for the intended drive operation of the motor vehicle, for example an electrical braking device, an electrical steering device and/or the like. By the coupling device, the electrical coupling can be achieved in presettable manner. For this purpose, the coupling device can comprise one or more switching elements, which can be switched in suitable manner to realize the desired functionality. Thus, it can for example be provided that the electrical coupling to the exactly one sub-battery is effected via a respective switching element to ensure the energy supply of the electrical devices. By the switching elements, it can be achieved that a malfunction of a sub-battery does not have to affect the other coupled energy sources and thus in particular not the entire energy supply of the electrical devices, in particular not the electrical devices, which are connected with the safety supply terminals. By suitable switching measures, namely, the at least two safety supply terminals can be decoupled from each other in terms of energy supply. Thereby, it is possible to improve the reliability and the safety, in particular of electrical devices, which are required for the safety of the intended operation of the motor vehicle.

The same basically also applies to the safety supply terminals, to which safety-relevant electrical devices can be connected. Exclusively electrical devices may be connected with these terminals, which satisfy certain electrical safety conditions according to the initially mentioned standardization. This means, such electrical devices are for example to be suitable to largely avoid a reaction by a malfunction occurring in the electrical device to the safety supply terminal, to which it is connected itself. The background is in that mechanical protective elements like fuses are unsuitable hereto in many cases due to their inert switching behavior. Fuses usually serve for the line protection and therefore usually cannot realize the functionality desired here. Therefore, particularly electronic protective elements are employed as a protective element, which for example can also comprise a switching element. However, a protective element can also be saved if it can for example be constructively prevented for a respective one of the electrical devices that a short circuit can for example occur in the area of the energy supply thereof. For example, this can be achieved by a series connection of capacitors instead of an individual capacitor, which is connected between the electrical potentials of the supply voltage, such that a short circuit in this capacitor does not result in a short circuit of the supply voltage. Moreover, it can be provided that in case of a malfunction occurring in the safety supply terminals, a protective element can be actuated. Of course, further relevant electrical characteristics can moreover be provided for safety reasons.

For example, if redundancy with respect to the braking system is requested, it can be provided that two braking systems independent of each other are provided, wherein one of the braking systems is connected with the first safety supply terminal and the second one of the braking systems is connected with the second safety supply terminal. If a malfunction occurs in one of the two safety supply terminals, which influences a braking system connected with this safety supply terminal, a corresponding deactivation can be effected by the coupling device according to the invention such that the other one of the braking systems can be further operated as intended. For this purpose, corresponding switching elements are provided, by which it is possible to deactivate the respective safety supply terminal in case of a corresponding malfunction, namely depending on the switching state thereof. Moreover, there is the possibility of realizing the energy supply of both braking systems only from one of the two energy sources via the coupling device and corresponding switching states of the switching elements, whereby a malfunction in one of the two energy sources either does not have to result in the function of the braking systems being impaired. Of course, this also applies to any further electrical devices, which can be connected with the safety supply terminals.

Therein, it is additionally to be taken into account that the electrical devices do not have to be necessarily only electrical loads, but further electrical energy sources can also additionally be provided, or an electrical device can consume or provide electrical energy depending on a respective operating state. However, it is, for example, provided for the safety supply terminals that only electrical loads are connected here.

The switching element can be configured by one or more semiconductor switching elements. Moreover, the switching element can also comprise at least one electromechanical switching element, for example a relay, a contactor and/or the like. Basically, the semiconductor switching element can also be configured by an electromechanical switching element or any other suitable switching element.

In particular, the switching element can be configured as a semiconductor switching element, for example by a transistor, in particular a field effect transistor, for example a metal oxide field effect transistor (MOSFET), an insulated gate bipolar transistor (IGBT), but also by a gate turn-off thyristor (GTO) and/or the like or any other type of switching elements. These switching elements are, for example, arranged integrated in the coupling device.

For providing the desired switching functionality by the coupling device, the semiconductor switching elements are operated in the switching operation. With respect to a semiconductor switching element using a transistor, the switching operation means that a very small electrical resistance is provided between the terminals of the transistor forming a switching path in a turned-on switching state such that a high current flow at very small residual voltage is possible. In contrast, in a turned-off switching state, the switching path of the transistor is high-ohmic, that is it provides a very high electrical resistance such that substantially no or only a very low, in particular negligible, current flow is present with high electrical voltage applied to the switching path. A linear operation in transistors differs from it.

According to an exemplary embodiment, the switching elements are connected with at least one control apparatus, which provides corresponding control signals for the switching elements, such that the switching elements take the desired switching state. The control apparatus is at least connected with the switching elements, in particular the semiconductor switching elements of the power-distributing device. The control apparatus may be formed at least partially integrated in the coupling device. Moreover, the coupling device, in particular the control apparatus, can comprise a communication interface, via which it is in communication link with a superordinated control, for example a vehicle control. In order to control a switching element, the control apparatus is at least partially integrated in the coupling device because the switching operations are to be very fast effected for example in case of a hard short circuit, for example faster than about 500 μs, for example faster than about 100 μs.

For example, the communication interface can be formed wired and/or else wireless. A wirelessly formed communication link can for example be based on radio, in particular short-range radio. For example, each of the switching elements comprises an own communication interface, by which it is in communication link with the control apparatus. In particular, the device-side communication interface can be connected with a respectively integrated part of a switching element control, which in turn is connected at least to the semiconductor switching elements, to control them with respect to their switching state in presettable manner.

Thereby, an activation or a deactivation of the respective supply path can be controlled by the control apparatus.

The control apparatus itself can be provided as a separate component. However, it i may be a constituent of the coupling device and, for example, arranged integrated in it.

Accordingly, an example of the invention allows enabling at least a partial operation of the vehicle electrical system in case of very different malfunction types such that especially safety-relevant systems can be reliably further operated. Thereby, the invention also allows being able to achieve the safety requirements according to the initially indicated standards. This is supported in that at least two safety supply terminals are also provided according to the invention. Independently thereof, one or more conventional supply terminals can of course be provided, however, wherein the attention with respect to the coupling device directs particularly to the reliable functionality at the safety supply terminals.

For realizing one or more certain coupling states, which can be taken, the coupling device can comprise one or more corresponding switching elements. However, the coupling device can moreover also comprise electrical lines, power-distributing devices and/or the like to be able to establish an electrical connection to the electrical devices connected or connectable to the respective terminals of the coupling device. In particular, it can of course be provided that the coupling device can also be connected with the at least one conventional supply terminal.

Moreover, it can be provided that the coupling device comprises one or more electrical energy converters to for example be able to perform a voltage adaptation as needed. The energy converter can be configured for a unidirectional energy conversion, namely for example for an energy flow from the vehicle battery or the respective sub-battery to the respective safety supply terminal. Moreover, there is of course the possibility that the energy converter is also configured as a bidirectional energy converter, which allows an energy flow in both directions, thus also from an electrical device connected with a safety terminal to the vehicle battery or to the respective sub-battery.

Overall, the invention allows enabling a permanently safe electrical energy supply, particularly for X-by-wire systems, such that in particular the highest safety integrity according to ASIL D can also be verifiably achieved. Similarly, further requirements such as for example ECE R 79, ECE R 13 and further can also be realized. The invention further allows using scale effects, in particular with respect to HAF und X-by-wire, to for example be able to save energy storages in the range of low voltage.

Thus, the invention allows being able to particularly reliably and safely supply electrical devices connected with the safety supply terminals with electrical energy also in unfavorable operating situations. This does not only apply to the first aspect, but also similarly to the second aspect, in which an alternative energy supply can be realized via the conventional supply terminal.

According to an advantageous development, it is proposed that the vehicle electrical system may comprise a first connection switching element, which is electrically coupled to the first or the second safety supply terminal on the one hand and to the at least one conventional supply terminal on the other hand and is configured to electrically couple the respective first or second safety supply terminal to the conventional supply terminal depending on a switching state of the first connection switching element. This development allows enabling an energy supply of the respective first or second safety supply terminal alternatively or additionally via the conventional supply terminal if the energy supply of the respective first or second supply terminal otherwise can no longer be ensured due to a malfunction. By the first connection switching element, thus, an additional redundancy can be achieved in terms of energy supply if it is required. By the first connection switching element, however, it can also be achieved that the electrical coupling to the conventional supply terminal can be interrupted if a malfunction, for example an electrical short circuit or the like, occurs in the area of the conventional supply terminal or at the electrical devices connected to it. By switching the first connection switching element into the turned-off state, thus, a reaction to the first or second safety supply terminal and to the electrical devices connected to it can be largely avoided. Thereby, the reliable operation of the electrical devices connected with the respective safety supply terminal can be improved.

Moreover, it is proposed that the decoupling device may comprise a power-distributing device, which is electrically coupled to the at least two sub-batteries and which provides the at least one first and second safety supply terminal as well as the at least one conventional supply terminal, wherein the power-distributing device comprises a coupling apparatus for electrically coupling the terminals as well as each one source switching element for each of the at least one sub-batteries, which is configured to electrically couple the respective sub-battery to the coupling apparatus depending on a switching state, wherein the power-distributing device comprises a supply switching element for each of the at least two safety supply terminals, which is configured to electrically couple the respective safety supply terminal to the coupling apparatus depending on a switching state. For this purpose, it is provided that an electrical coupling of the terminals to each other can be achieved by the coupling apparatus. By using the switching elements and correspondingly suitable switching, the desired functionality can be realized. Thus, it can be provided that the two energy sources, which are connected with the respective power source terminals, can be connected in parallel via the coupling apparatus in the turned-on state of the source switching elements to realize the energy supply of the electrical devices. Therein, it can be achieved by the at least one source switching element that a malfunction of one of the energy sources does not have to affect the entire energy supply of the electrical devices Namely, if a malfunction, for example a short circuit or the like, occurs in one of the electrical energy sources, the reaction to the remainder of the energy supply system can be largely avoided by switching the corresponding source switching element into the turned-off switching state. Thereby, it is possible to improve the reliability and the safety, in particular of electrical devices, which are required for the safety of the intended operation of the motor vehicle.

Basically, the same also applies to the safety supply terminals, to which safety-relevant electrical devices can be connected. Exclusively electrical devices may be connected with these terminals, which satisfy certain electrical safety conditions according to the initially mentioned standardization. This means that such electrical devices are for example to be suitable to largely avoid a reaction due to a malfunction occurring in the electrical device to the safety supply terminal, to which it is connected itself. The background is that mechanical protective elements like fuses are unsuitable hereto in many cases due to their inert switching behavior. Therefore, particularly electronic protective elements are employed as the protective element, which can for example also comprise a switching element. However, a protective element can also be saved if it can for example be constructively prevented for a respective one of the electrical devices that a short circuit can for example occur in the area of the energy supply thereof. For example, this can be achieved by a series connection of capacitors instead of an individual capacitor, which is connected between the electrical potentials of the supply voltage, such that a short circuit in this capacitor does not result in a short circuit of the supply voltage. Moreover, it can be provided that a protective element can be actuated in the case of a malfunction occurring in the safety supply terminals. Moreover, further relevant electrical characteristics can of course be provided for safety reasons.

Further, it is proposed that the vehicle electrical system may comprise a second connection switching element electrically coupled to the first and the second safety supply terminal, which is configured to electrically couple the first and the second safety supply terminal depending on a switching state of the second connection switching element. Thereby, it is possible to provide an energy supply parallel for both safety supply terminals as needed. This can be advantageous if the energy supply of one of the safety supply terminals can no longer be ensured. Moreover, it can of course also be provided that a common energy supply for the first and the second safety supply terminal can be electrically disconnected from one of the safety supply terminals, for example if a malfunction, for example in the manner of a short circuit or the like, has occurred in the area of this safety supply terminal. The safety and the reliability can be further improved.

According to an advantageous development, it is proposed that a supply terminal battery may be connected with at least one of the at least two safety supply terminals. The supply terminal battery can effect additional safety. On the one hand, it can be achieved with the supply terminal battery that an energy supply can be at least partially further maintained in case of a faulty energy supply at the respective safety supply terminal. Moreover, the supply terminal battery can also be useful to be able to better or faster actuate a protective or safety function in case of a malfunction occurring at one or more of the electrical devices connected with the respective safety supply terminal, for example in case of a short circuit in the area of the electrical device or the like. Thus, the actuation of a protective element can for example be ensured or supported. Overall, the reliability and safety can be further improved.

Moreover, it is proposed that the coupling device may comprise at least one energy converter, which electrically couples at least one of the safety supply terminals to the sub-battery. Thereby, it can be achieved that a rated voltage of the sub-battery can be at least partially decoupled from an operating voltage of the respective safety supply terminal. Thereby, it is possible that the terminals of the vehicle electrical system, in particular the safety supply terminals and/or the at least one conventional supply terminal, do not have to be operated with the same electrical voltage. Moreover, it can be achieved by the energy converter that an energy flow from the respective sub-battery to the respective safety supply terminal or inversely can be controlled. This additionally allows to be able to at least partially realize a balancing with respect to the sub-batteries. For example, it can be provided that the coupling device comprises switching elements, by which the safety supply terminals are electrically coupled to a respective one of the sub-batteries of the vehicle battery as needed, to be able to keep deviations of states of charge of the sub-batteries as low as possible or to be able to control them. This means that a safety supply terminal does not have to be exclusively electrically coupled to a preset sub-battery. Rather, this electrical coupling can be configured variable in time, for example in that a change with respect to the coupling to the respective sub-battery can be effected at presettable points of time and/or states of charge of the sub-batteries. The energy converter can be configured as a DC/DC converter. For example, it can be configured as a galvanically insulated energy converter. However, it can also be provided that the safety supply terminals and/or the at least one conventional supply terminal use a common electrical reference potential. In such a case, it is advantageous if the energy converters comprise a galvanic isolation. However, one of the energy converters can for example also be configured without galvanic isolation. Thereby, the reference potential can be looped through to the vehicle battery. For example, the energy converter is electrically coupled to exactly one single sub-battery. However, it can alternatively also be provided, in particular with respect to the second aspect, that the energy converter is electrically coupled to two or more sub-batteries.

According to an exemplary embodiment, it is proposed that the at least one energy converter may be connected with at least two sub-batteries in electrically separated manner. Thereby, there is the possibility that the energy converter itself can be redundantly supplied with electrical energy from two sub-batteries operable independently of each other such that a redundancy is provided with respect to the energy provision functionality of the energy converter. Electrically separated may mean that an electrical coupling between electrical potentials of the sub-batteries connected with the at least one energy converter is substantially avoided. Thereby, it can be achieved that the sub-batteries cannot be electrically coupled to each other in undesired manner. This allows being able to nearly arbitrarily select sub-batteries of the vehicle battery for coupling to the at least one energy converter. For this purpose, the energy converter can for example have a galvanic isolation for each sub-battery connected to it.

According to an exemplary embodiment, the vehicle battery may be configured such that the sub-batteries can be operated at least partially independently of each other. Hereto, battery switching elements can for example be provided, by which a respective one of the sub-batteries can be activated or deactivated for the intended operation. The battery switching element can be a reversibly configured switching element, for example an electromechanical switching element or else an electronic switching element, as already explained above. However, the battery switching element can moreover also comprise an irreversible switching element in the manner of a protective element or the like, for example a pyro fuse, a fuse and/or the like.

Further, it is proposed that the coupling device may be connected with the vehicle battery in uninterrupted manner. This development takes into account that the vehicle battery, in particular if it is a high-voltage battery, can or is to comprise one or more battery contactors to be able to protect the vehicle battery from dangerous operating states. In such a case, the battery contactors are switched into a turned-off switching state, which results in that fact that the conventional supply terminal usually either can no longer be supplied with electrical energy. However, this is unfavorable or optionally even dangerous for safety-relevant electrical devices. Therefore, the coupling device is, for example, connected immediately to the vehicle battery or to the respective sub-batteries to be able to at least partially still maintain an electrical energy supply even if the battery contactors are in the turned-off switching state. Therefore, uninterrupted in particular means that the coupling device can remain electrically coupled to the respective sub-batteries of the vehicle battery substantially independently of a respective switching state of the battery contactor or the battery contactors. However, for the protection of the vehicle battery or the respective one of the sub-batteries, it can be provided that the coupling device comprises corresponding protective mechanisms, in that a connected energy converter is for example controlled in corresponding manner by the control apparatus, dispensable electrical devices at the safety supply terminals are largely deactivated and/or the like. Moreover, a driving state of the motor vehicle can of course also be taken into account. If the motor vehicle is stopped, a start can be blocked and the safety supply terminals can also be at least partially deactivated at the same time. Therefore, in a motor vehicle outside of the intended drive operation, for example a braking system or else a steering system does not have to be necessarily further supplied with electrical energy. Hereby, the safety and the reliability can be further improved.

The advantages and effects specified for the vehicle electrical system of the first aspect of course also equally apply to the vehicle electrical system of the second aspect, if applicable, and vice versa. Furthermore, the advantages and effects specified for the vehicle electrical systems of the first and/or the second aspect also apply to the motor vehicle equipped with the vehicle electrical system and vice versa. Of course, this also applies to the methods. Thus, device features can be formulated as method features and vice versa.

The control apparatus for the vehicle electrical system and the motor vehicle, respectively, also belongs to the invention. The control apparatus can comprise a data processing device or a processor device, which is configured to perform an embodiment of the control of the vehicle electrical system according to the invention. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which is configured, upon execution by the processor device, to perform the control of the vehicle electrical system according to the invention, in particular its coupling device. The program code can be stored in a data memory of the processor device.

The motor vehicle according to aspects of the invention is, for example, configured as a car, in particular as a passenger car or truck, or as a passenger bus or motorcycle.

Aspects of the invention also include the combinations of the features of the described embodiments. Thus, aspects of the invention also include realizations, which each comprise a combination of the features of multiple of the described embodiments if the embodiments have not been described as mutually exclusive.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
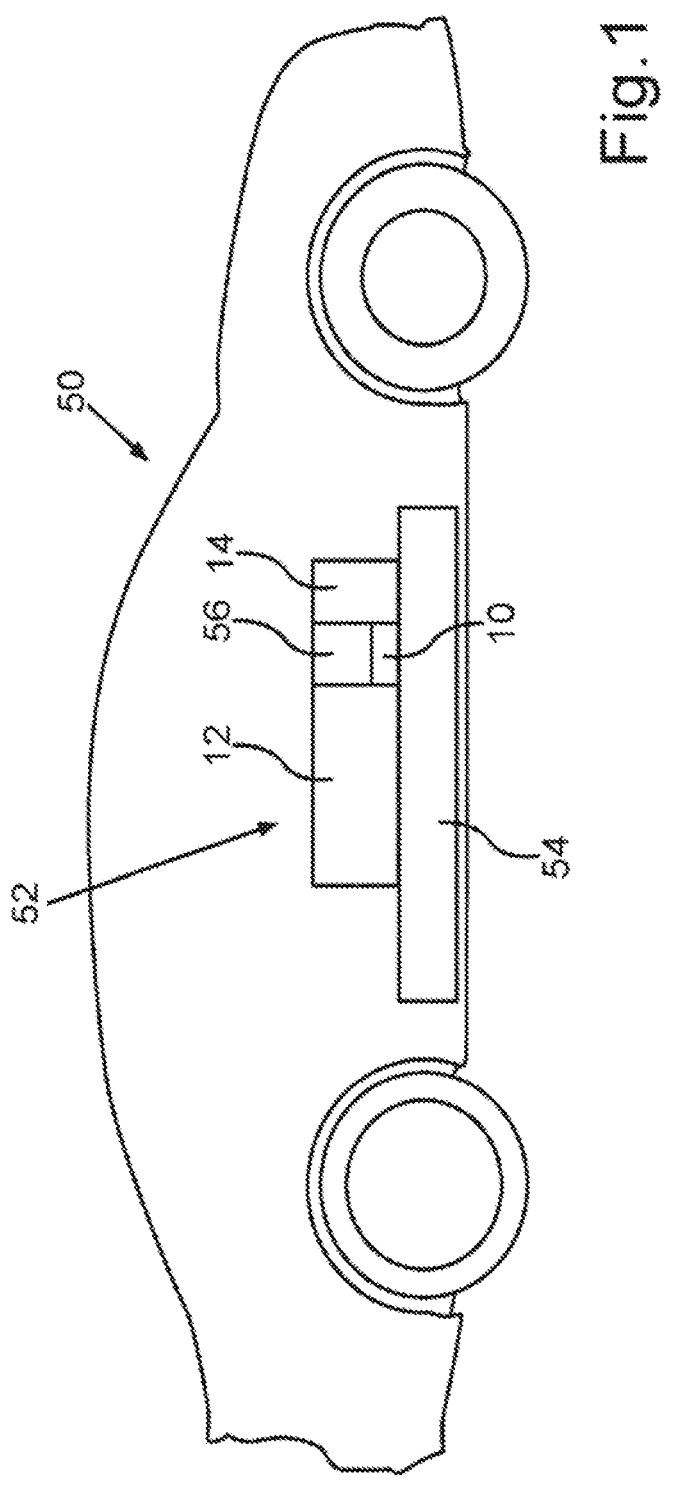
FIG. 1 shows an example of an electrically drivable motor vehicle with a vehicle electrical system, to which an electrical drive device and further electrical devices are connected.

Reference will now be made in detail to the preferred embodiments, examples of which are illustrated in the accompanying drawings, wherein like reference numerals refer to like elements throughout.

The execution examples explained in the following are example embodiments of the invention. In the execution examples, the described components of the embodiments each represent individual features of the invention to be considered independently of each other, which also each develop the invention independently of each other. Therefore, the disclosure also is to include combinations of the features of the embodiments different from the illustrated ones. Furthermore, the described embodiments can also be supplemented by further ones of the already described features of the invention.

In the figures, identical reference characters each denote functionally identical elements.

FIG. 1 shows an electrically drivable motor vehicle in a schematic side view, which is here formed as an electric vehicle 50. The electric vehicle 50 comprises a vehicle electrical system 52, to which a synchronous machine 12 for driving the electric vehicle 50 in an intended drive operation is connected. Presently, the synchronous machine 12 is configured as a multi-phase synchronous machine 12.

Further, a multi-phase inverter 56 as an energy converter is connected with the vehicle electrical system 52 and with the synchronous machine 12. Further, a vehicle battery 54 is connected with the vehicle electrical system 52, which serves for the electrical energy supply of the vehicle electrical system 52. Here, the reference character 54 is representative of a high-voltage battery. However, other combination possibilities are basically also conceivable here. Of course, one or more fuel cells can in particular also be provided. Of course, the fuel cells can also be combined with battery cells or sub-batteries. Other electrical energy sources can also be alternatively or additionally provided.

For the purpose of the energy distribution, the vehicle electrical system 52 comprises a coupling device 10, as it will be further explained in the following. Further, electrical devices are connected with the vehicle electrical system 52, which are collectively denoted by the reference character 14, 16 in this figure. Even if the motor vehicle 50 is presently formed as an electric vehicle, the invention is not restricted hereto and can similarly also be employed for example in a motor vehicle, which is drivable by a conventional combustion engine.

Figure 2:
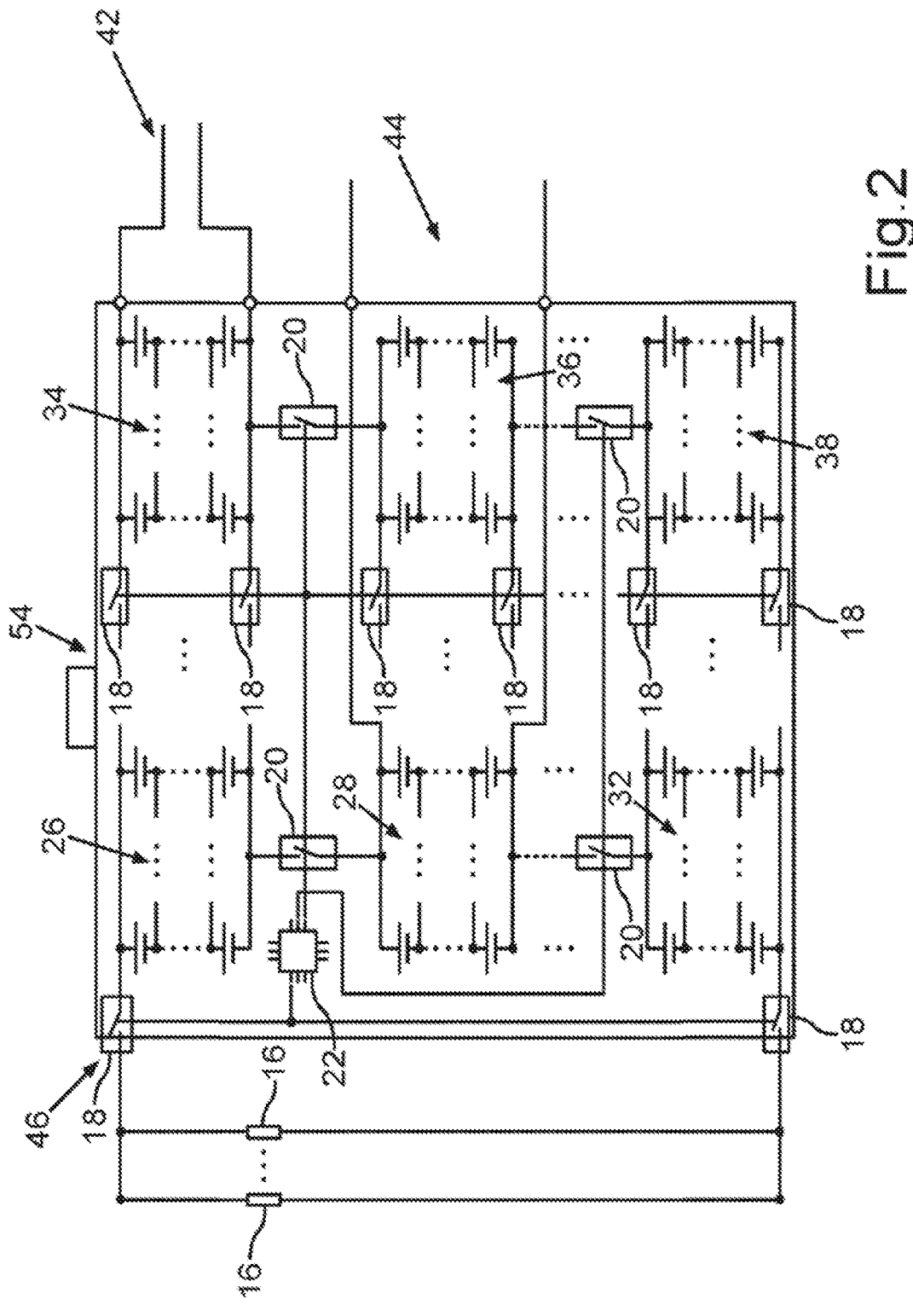
FIG. 2 shows an example of a construction of a lithium ion battery as a high-voltage vehicle battery.

FIG. 2 shows a construction of the vehicle battery 54 according to FIG. 1 in a schematic block diagram representation, which is presently configured as a high-voltage battery or lithium ion battery. However, the invention is not restricted to the application of high voltage. Basically, it can also similarly be employed exclusively for the range of low voltage without departing from the idea of the invention.

In the block diagram representation according to FIG. 2, it is apparent that the high-voltage battery 54 comprises a plurality of sub-batteries, of which six sub-batteries, namely the sub-batteries 26, 28, 32 as well as the sub-batteries 34, 36, 38 are schematically illustrated in FIG. 2. The sub-batteries 26, 28, 32 are exemplarily illustrated for a plurality of sub-batteries, which in turn each comprise a plurality of lithium ion cells or battery cells, which are not labeled in the representation according to FIG. 2. The battery cells of a respective one of the sub-batteries 26, 28, 32 are partially connected in parallel and partially also connected in series. The sub-batteries 26, 28, 32 as well as optionally further sub-batteries provided in this branch are in turn connected in series. Between two sub-batteries 26, 28, 32 immediately electrically coupled, a connection switching element 20 is respectively interposed such that the sub-batteries 26, 28, 32 can be electrically disconnected from each other. A further branch, which comprises the sub-batteries 34, 36, 38, is configured corresponding to the previously described battery branch of sub-batteries 26, 28, 32. The sub-batteries 34, 36, 38 can be connected in parallel with the respective sub-batteries 26, 28, 32 via further battery switching elements 18. Moreover, further corresponding strings of sub-batteries can be provided. The sub-batteries can be at least partially connected at least in series or else in parallel.

Further, the vehicle battery 54 includes a control apparatus 22, which provides a battery management. Among other things, the control apparatus 22 controls the connection switching elements 20. Moreover, battery switching elements 18 are provided, which are provided by a battery contactor. Thereby, not-illustrated battery terminals, at which the vehicle battery 54 provides high voltage, can be electrically disconnected from the sub-batteries or the battery cells. Electrical devices 16 suitable for high voltage are connected with the battery terminals not labeled.

Presently, each sub-battery can be non-reactively disconnected from the remaining ones of the sub-batteries via corresponding switching elements 18, 20. Such a switching element can for example be non-reactively disconnected from the further sub-batteries by a contactor, a relay, a pyro disconnector, an electronic switching element, which for example comprises at least one semiconductor switch. An operation for disconnecting a respective one of the sub-batteries can for example be actuated upon a captured error in a sub-battery or else at a conventional supply terminal 46 or at one of two illustrated safety supply terminals 42, 44. Hereto, it can be provided that the control apparatus 22 effects a corresponding actuation or control of the respective switching elements by corresponding switching signals. For this purpose, it can further be provided that the control apparatus 22 captures and evaluates electrical currents, electrical voltages as well as also temperatures, in particular in the area of the vehicle battery 54. However, this is not illustrated in the FIGS.

Basically, a supply tap or a safety supply terminal 42, 44 can be provided at a respective sub-battery 26, 28, 32, 34, 36, 38, to which either safety-relevant loads or electrical devices 14 are connected directly or else with interposition of an energy converter as will be explained in the following. According to desired error tolerance, a plurality of nearly non-reactive safety supply terminals can be realized in this manner.

Figure 3:
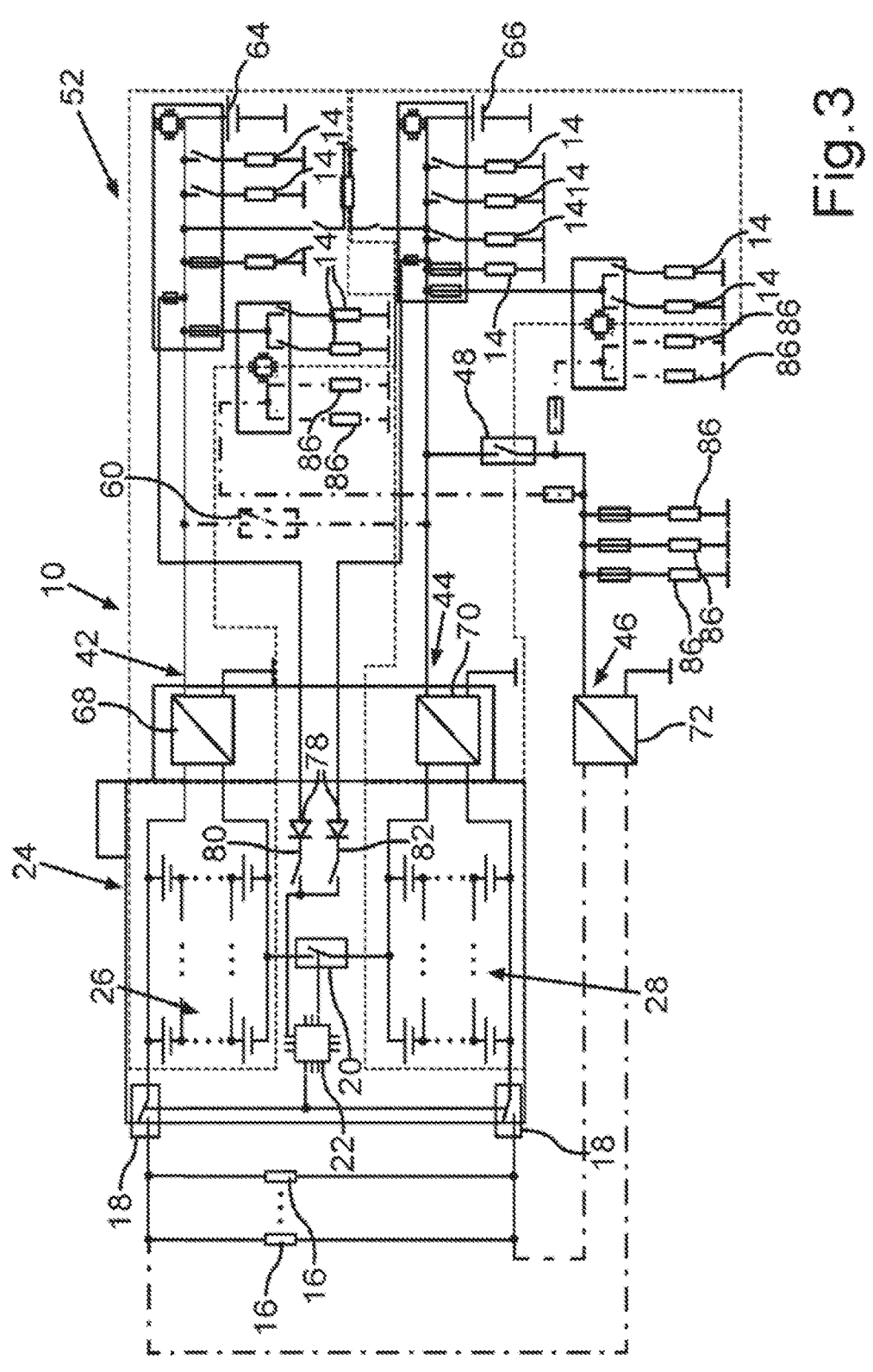
FIG. 3 shows an example of a first configuration of a vehicle electrical system, in which two safety supply terminals are supplied with electrical energy from sub-batteries of the high-voltage battery different from each other according to FIG. 2.

In order to be able to achieve the initially mentioned safety requirements, a minimum configuration is presently provided, in which each sub-battery comprises a plurality of battery cells, wherein the vehicle battery 54 comprises at least two sub-batteries 26, 28 (FIG. 3). The supply of further electrical devices 16, 86 with electrical energy, which are not safety-relevant, is presently non-reactively effected via the battery switching elements 18. The electrical devices 16 are designed for the operation with high voltage and immediately connected with the high-voltage terminal of the vehicle battery 54, whereas the electrical devices 86 are designed for the operation with low voltage. The electrical devices 86 are electrically coupled to the high-voltage terminal via a DC/DC converter 72. Therefore, the battery switching elements 18 indirectly also control the conventional supply terminal 46 among other things, to which the electrical devices 86 are connected.

It is further apparent from FIG. 2 that a safety supply terminal 42 is immediately connected with the sub-battery 34. The safety supply terminal 42 is thus connected with the sub-battery 34 in uninterrupted manner, that is that an electrical disconnection by the battery switching elements 18 is not provided between the safety supply terminal 42 and the sub-battery 34. Further, a second safety supply terminal 44 is connected with the sub-battery 28 in uninterrupted or immediate manner in the same manner. The safety supply terminals 42, 44 are supply terminals, at which safety-relevant functions with respect to the availability according to ASIL-D can be realized via two independent redundant supply paths.

FIG. 3 shows a schematic block diagram representation of a first configuration of a vehicle electrical system 52, in which the two safety supply terminals 42, 44 are supplied with electrical energy from sub-batteries 26, 28 of the high-voltage battery 54 different from each other according to FIG. 1. Further, a supply battery 64, 66 is connected with each of the safety supply terminals 42, 44, by which a closed current supply of the electrical devices 14 connected with the respective safety supply terminal 42, 44 can be realized. In this configuration, it is provided among other things that the safety supply terminal 42 is electrically coupled to the sub-battery 26 via a unidirectional DC/DC converter 68 as an energy converter. The safety supply terminal 44 is connected with the sub-battery 28 via a unidirectional DC/DC converter 70. Both energy converters 68, 70 are configured as galvanically insulated energy converters such that the corresponding sub-batteries 24, 26 are electrically separated from each other although the two safety supply terminals 42, 44 use the same electrical reference potential on the secondary side as also the conventional supply terminal 46. An electrical connection between the two sub-batteries 24, 26 via the DC/DC converters 68, 70 and the reference potential on the secondary side can thereby be avoided. This allows using nearly any pair of sub-batteries of the vehicle battery 54 for the safety supply terminals 42, 44.

An energy supply of the control apparatus 22 is redundantly effected from the safety supply terminals 42, 44 via diodes 76, 78, which are connected in series with a respective switching element 80, 82. Thereby, the control of the battery switching elements 18, 20 according to ASIL-D required for ensuring the non-reactive disconnection of the individual sub-batteries 26, 28 can be ensured as needed. Optionally, the supply batteries 64, 66 employed per path can assist the safety-relevant energy sources or sub-batteries 26, 28 in the supply.

Further, a coupling device 10 is connected with the vehicle battery 54 in uninterrupted manner, to which the first and second safety supply terminals 42, 44 are also connected. The coupling device 10 is configured to electrically couple the first and the second safety supply terminal 42, 44 each to exactly one of the sub-batteries 26, 28 depending on a coupling state of the coupling device 10. Here, the coupling is correspondingly effected via the DC/DC converters 68, 70. This means that the coupling device 10 also includes the DC/DC converters 68, 70.

For the purpose of the energy transfer—as will be further explained in the following-power-distributing devices can be employed, which can be realized by conventional elements like fuses, hybrid elements like fuses plus additional electronics such as for example relays, semiconductor switching elements, PTE or the like or also in fully electronic manner. Therein, the power-distributing devices as well as also the electrical devices can be supplied from different supply terminals 42, 44. Therein, an absence of reaction at the supply terminals 42, 44 can be ensured by the power-distributing device or else the electrical device itself, for example via non-reactive disconnecting elements, a continuous potential separation and/or the like.

Optionally, the two safety supply terminals 42, 44 can be electrically coupled to each other via a first connection switching element 60 depending on the switching state thereof. Electrical devices not safety-relevant with respect to the availability, such as for example a seat heater, a navigation device, a radio and/or the like, are for example connected with the conventional supply terminal 46 as electrical devices 86. They can be electrically connected with one of the two safety supply terminals 42, 44 via a non-reactively separable connection switching element 48. Presently, it is provided that such an electrical connection to the safety supply terminal 44 exists. The connection switching element 48 is for example switched into the turned-off switching state before a safety-critical undervoltage or overvoltage can be caused by an electrical device 86 at the conventional supply terminal 46.

Presently, a bidirectional DC/DC converter 72 is further connected with the battery switching elements 18, which provides the conventional supply terminal 46, to which the electrical devices 86 can at least partially also be connected. Optionally, low voltage can be provided at the conventional supply terminal 46 by the energy converter 72.

The DC/DC converters 68, 70, 72 presently serve to provide a DC voltage of about 12 V on their undervoltage side, such that a voltage conversion is not required upon coupling via one of the connection switching elements 60, 48.

Figure 4:
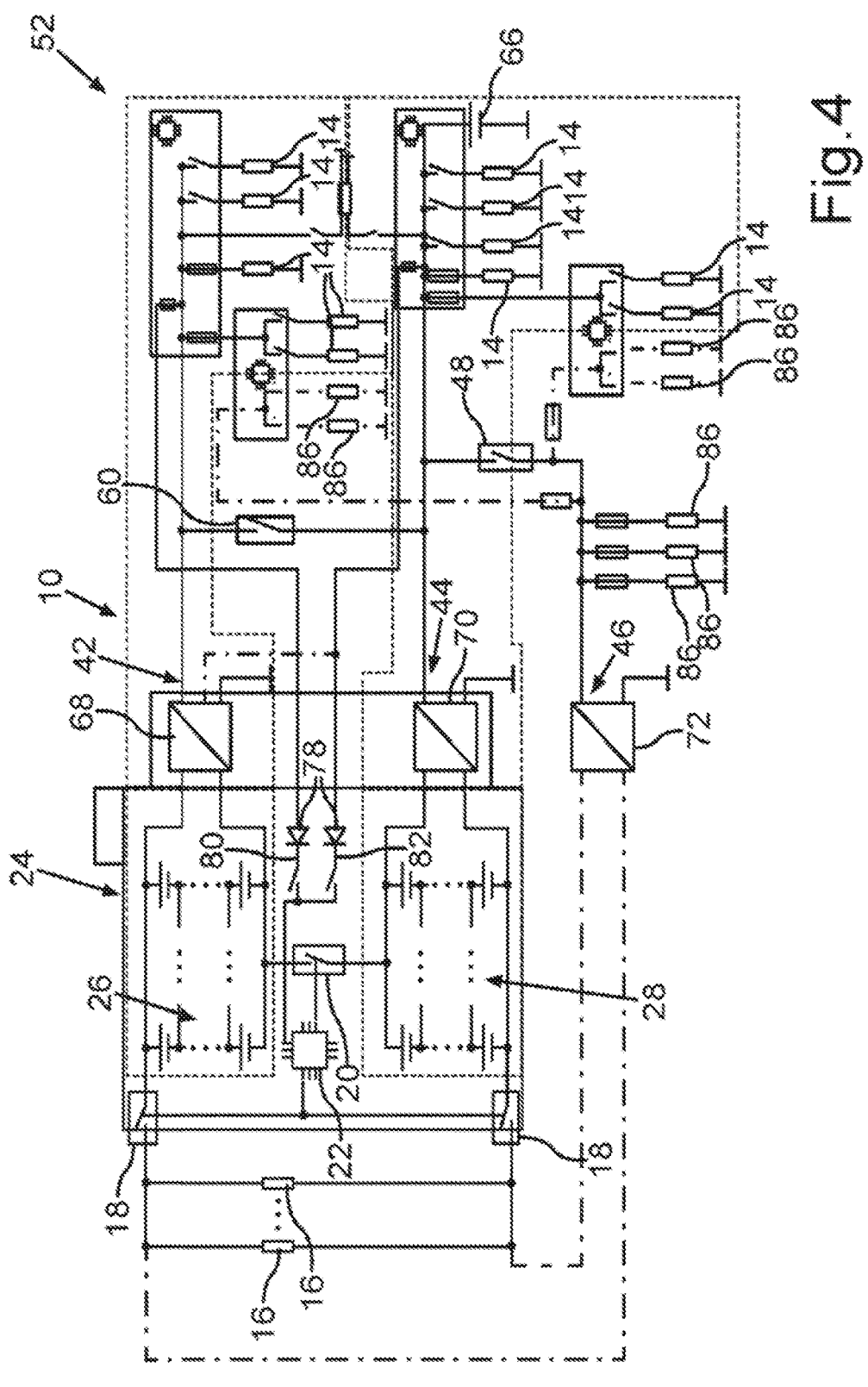
FIG. 4 shows an example of a second configuration of a vehicle electrical system, in which a supply battery is only connected with one of the two safety supply terminals and the two safety supply terminals can be electrically coupled to each other by a connection switching element.

FIG. 4 shows a further schematic block diagram representation like FIG. 3 for a second configuration of a vehicle electrical system 52, in which the supply battery 64 is saved. The function of the vehicle electrical system 52 according to FIG. 4 is based on the function of the vehicle electrical system 52 according to FIG. 3, wherefore reference is additionally made to the relevant explanations. In the following, only the differences are explained.

The vehicle electrical system 52 according to FIG. 4 differs from the vehicle electrical system 52 according to FIG. 3 in that the second connection switching element 60, which can only be optionally present in the configuration according to FIG. 3, is mandatorily present in this configuration. Thereby, a closed current supply of the electrical devices 14, which are connected with the first safety supply terminal 42, can be realized via the supply battery 66, such that the supply battery 64 according to the configuration according to FIG. 3 can be saved without safety losses or reliability losses having to be accepted.

Figure 5:
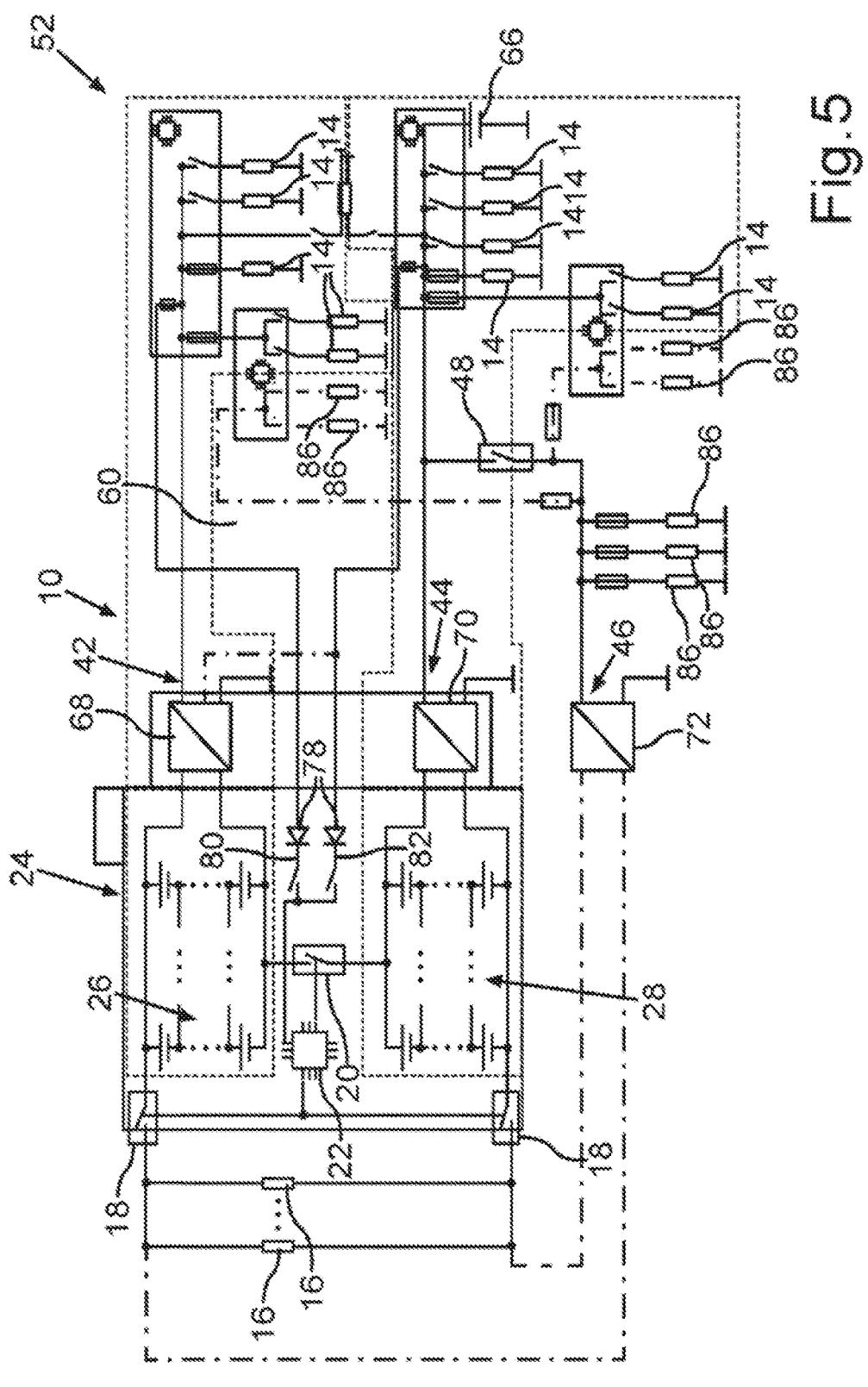
FIG. 5 shows an example of a third configuration of a vehicle electrical system, which is based on the second configuration without connection switching element.

FIG. 5 shows a third configuration of a vehicle electrical system 52 in a schematic block diagram representation like FIG. 4, which is based on the second configuration of the vehicle electrical system 52 according to FIG. 4. The configuration of the vehicle electrical system 52 according to FIG. 5 differs from the configuration of the vehicle electrical system 52 according to FIG. 4 in that the second connection switching element 60 is no longer provided. In this variant, a closed current supply of the electrical devices 14, which are connected with the safety supply terminal 44, can be effected either via the sub-battery 24 and the DC/DC converter 68 or else it can be completely omitted in electrical devices 14 optimized in cold start. In this case, a start of the energy supply at the first safety supply terminal 42 can be effected by the sub-battery 24 upon a start of the motor vehicle.

Figure 6:
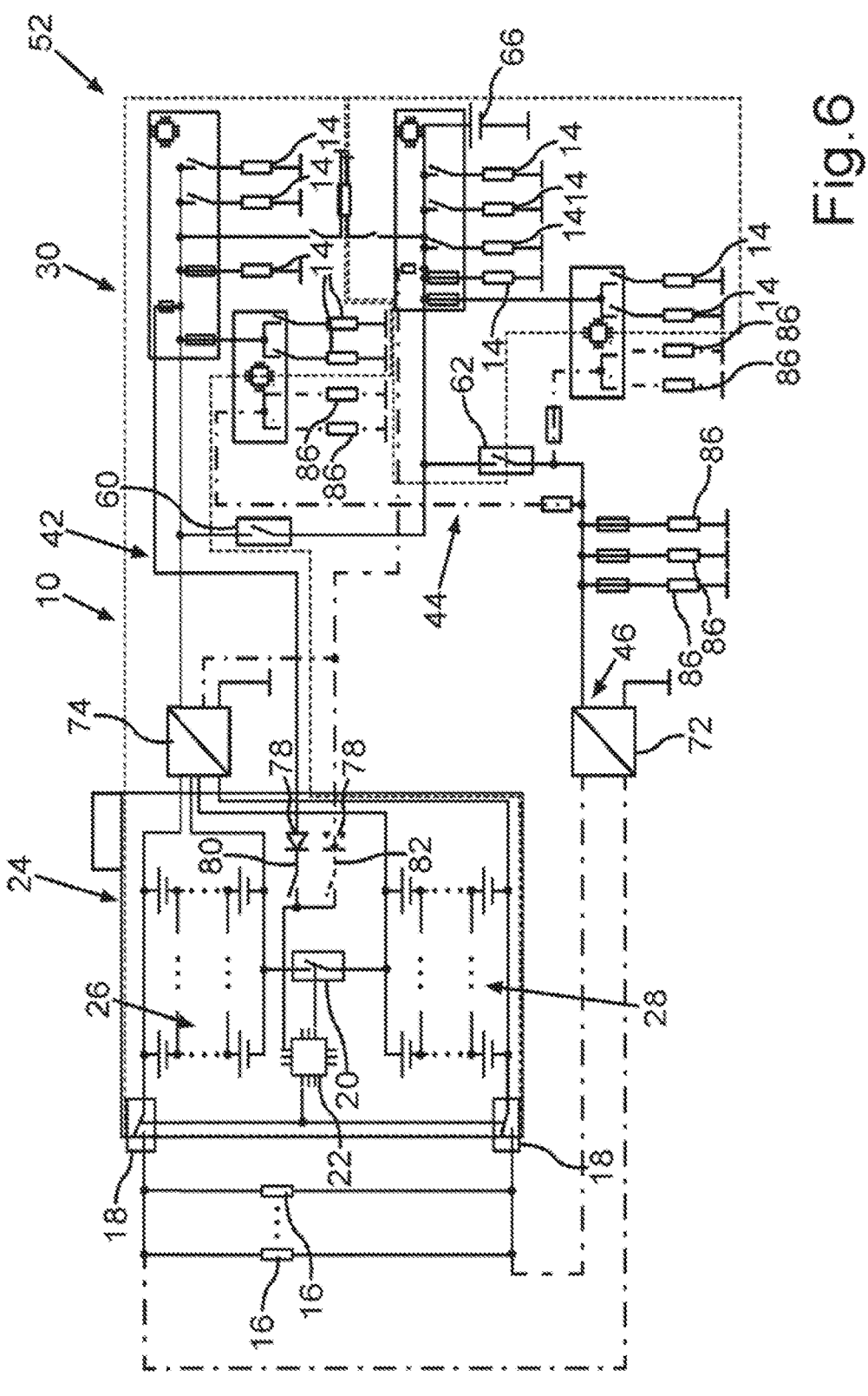
FIG. 6 shows an example of a fourth configuration of a vehicle electrical system, in which one of the two safety supply terminals can be redundantly supplied from two sub-batteries from an energy converter and the other one of the two safety supply terminals can be electrically coupled to a conventional supply terminal or the other safety supply terminal.

FIG. 6 shows a fourth configuration of a vehicle electrical system 52 in a further schematic block diagram representation like FIG. 3, in which one of the two safety supply terminals 42, 44, presently the safety supply terminal 42, can be redundantly suppled from an energy converter 74 by two sub-batteries 26, 28. The other one of the two safety supply terminals 44 is electrically coupled to the other safety supply terminal 42 via the first connection switching element 60. Moreover, the supply battery 66 is connected with the safety supply terminal 44.

Presently, the energy converter or DC/DC converter 74 has a safety integrity according to ASIL-x(D). For this purpose, the DC/DC converter 74 is connected both to sub-battery 26 and to the sub-battery 28. Thereby, there is the possibility of realizing the energy supply for the safety supply terminal 42 according to operating state of the DC/DC converter 74 either by the sub-battery 26 or by the sub-battery 28. Of course, a common energy supply from both sub-batteries 26, 28 can also be provided at the same time. This can be controlled by the control apparatus 22. For example, the DC/DC converter 74 is configured as a galvanically insulated energy converter such that the electrical potentials at the DC/DC converter 74 can be separated from each other on the primary side as well as also on the secondary side. However, a circuit structure can basically also be provided, which allows saving the galvanic isolation.

Via the second connection switching element 60, the safety supply terminal 44 can also be supplied with electrical energy at the same time. In this respect, the safety supply terminals 42, 44 can be connected in parallel by the second connection switching element 60. Moreover, the second safety supply terminal 44 can also be electrically coupled to the conventional supply terminal 46 by the connection switching element 62. Moreover, it is presently provided that an energy supply for the control apparatus 22 as well as an energy converter control of the DC/DC converter 74 can also be ensured via the second safety supply terminal 44. However, the energy supply is presently provided via the first safety supply terminal 42.

For the rest, the further above mentioned explanations as they were already explained to the preceding embodiments apply with respect to the energy distribution and the connected electrical devices, wherefore reference is additionally made to the relevant explanations. This in particular applies to the electrical devices 14, which are connected with the safety supply terminals 42, 44. By the second connection switching element 60, charging of the supply battery 66 as well as also a closed current supply of the electrical devices, which are connected with the safety supply terminal 42, can further be achieved.

Figure 7:
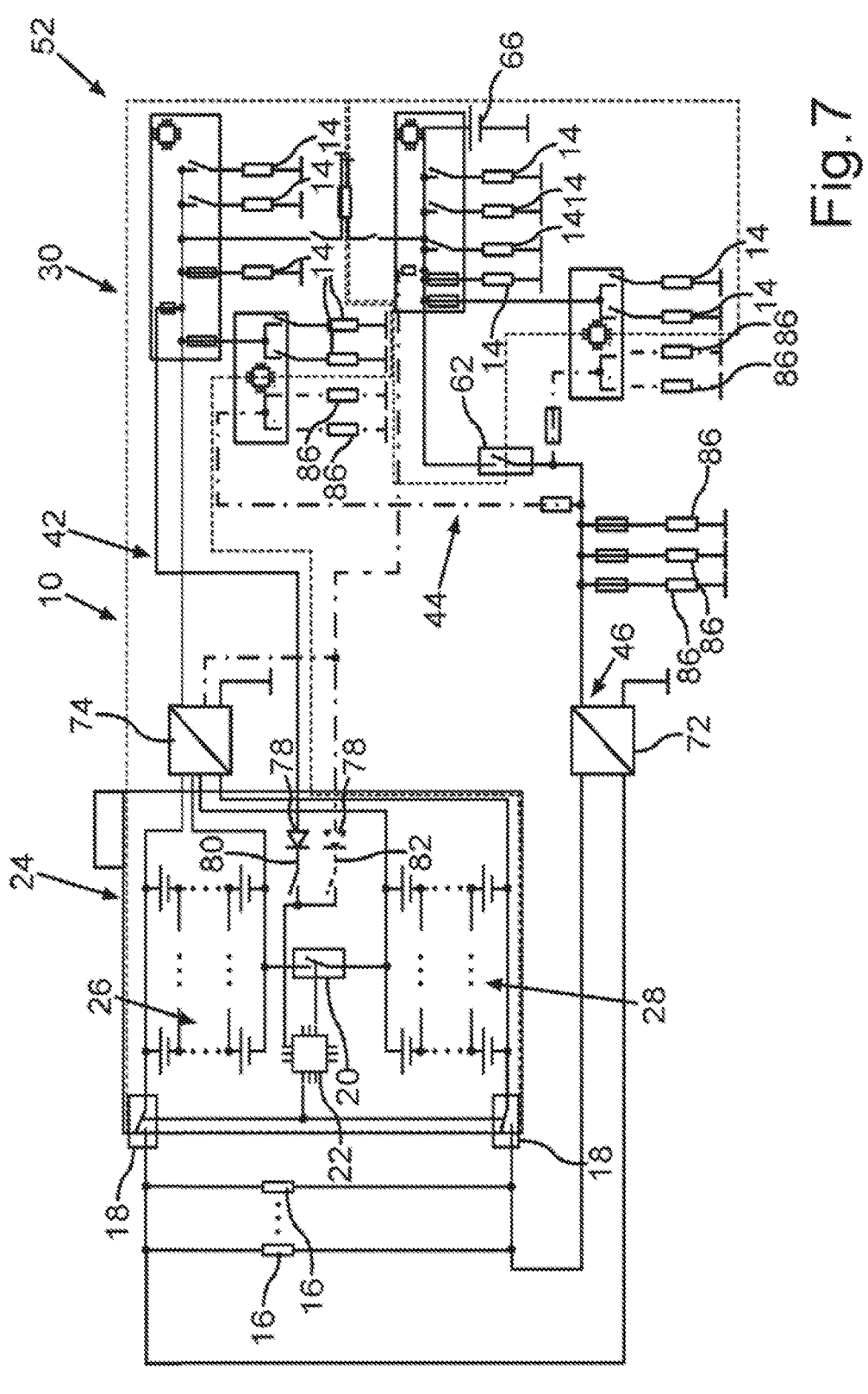
FIG. 7 shows an example of a fifth configuration of a vehicle electrical system without connection switching element between the two safety supply terminals.

FIG. 7 shows a further schematic block diagram representation like FIG. 6 for a fifth configuration of a vehicle electrical system 52, in which the second connection switching element 60 is not provided or saved. In this configuration, a closed current supply of the electrical devices 14 connected with the first safety supply terminal 42 can be achieved either via the DC/DC converter 74 or can be completely omitted in electrical devices 14 optimized in cold start as it was already explained based on FIG. 5, wherefore reference is made to the corresponding explanations in this respect.

Figure 8:
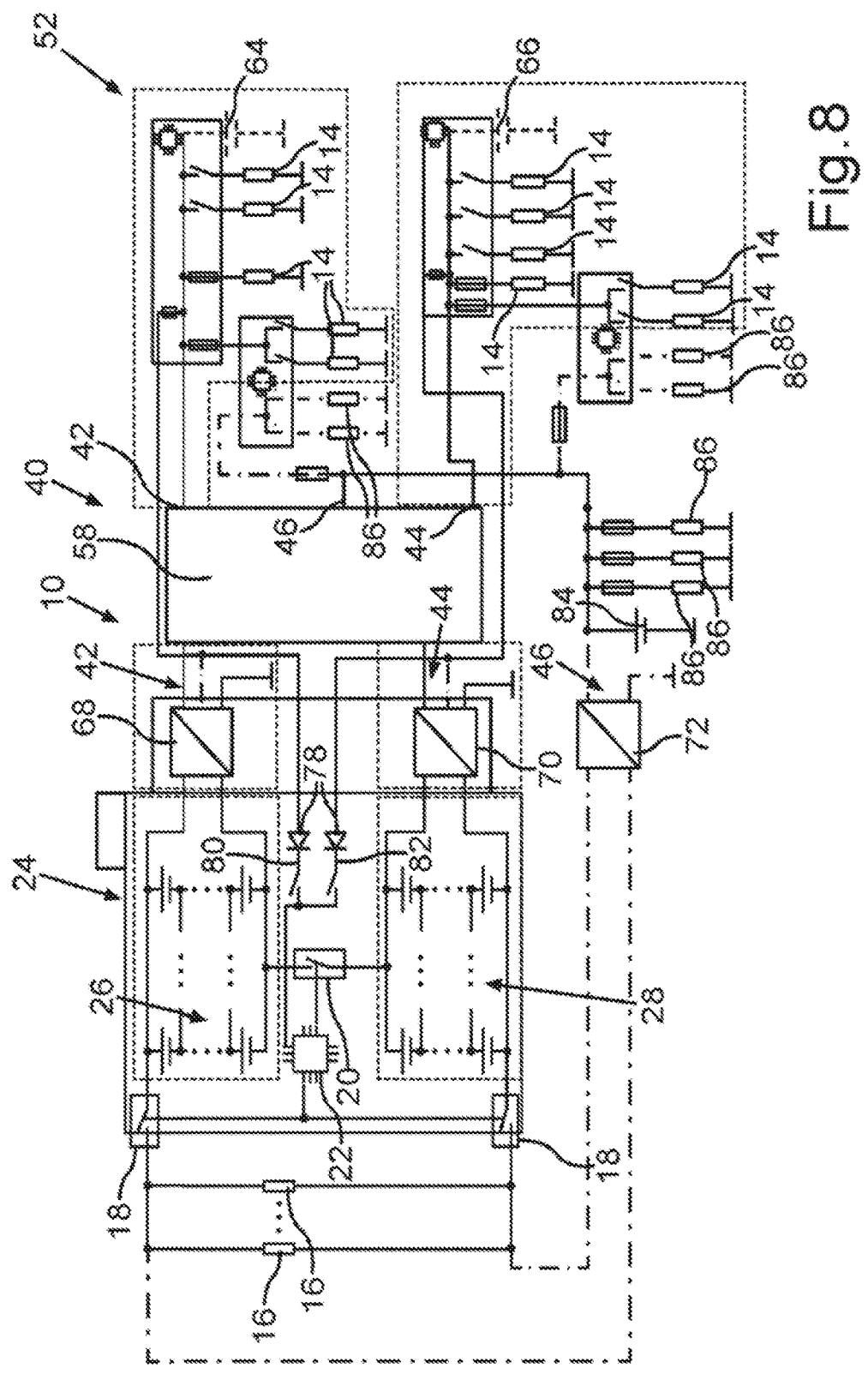
FIG. 8 shows an example of a sixth configuration of a vehicle electrical system, in which a power-distributing device is provided.

FIG. 8 shows a sixth configuration of a vehicle electrical system 52 in a further schematic block diagram representation like FIG. 3, in which a power-distributing device 58 is provided. Here, the vehicle electrical system 52 comprises a coupling device 40, which in turn comprises a power-distributing device 58, which is electrically coupled to the two sub-batteries 26, 28. The power-distributing device 58 provides the first and the second safety supply terminal 42, 44 as well as the conventional supply terminal 46, as it was already previously explained to the preceding examples. The power-distributing device 58 in turn comprises a coupling apparatus not illustrated for electrically coupling the terminals 42, 44, 46 as well as each one source switching element for each of the two sub-batteries 26, 28, which is configured to electrically couple the respective sub-battery 26, 28 to the coupling apparatus depending on a switching state. The power-distributing device 58 comprises a supply switching element for each of the safety supply terminals 42, 44, which is configured to electrically couple the respective safety supply terminal 42, 44 to the coupling apparatus depending on a switching state. For this purpose, the coupling apparatus can for example comprise at least one busbar, electrical lines and/or the like. Of course, corresponding electrical lines can also be included by the coupling apparatus. By a suitable circuit structure and the corresponding switching elements, it can be achieved that the DC/DC converter 68 can for example be connected either to the safety supply terminal 42 or to the safety supply terminal 44. Moreover, it can of course also be provided that both safety supply terminals 42, 44 can be connected hereto. The same basically also applies to the DC/DC converter 70. Moreover, additional switching elements can be provided to be able to additionally or alternatively provide an energy supply for the conventional supply terminal 46. Optionally, the supply batteries 64, 66 can of course also be connected with the safety supply terminals 42, 44, as it has already been explained based on the first embodiment according to FIG. 3. The respective DC/DC converter 68, 70 can be realized from the respective safety supply terminal 42, 44 with respect to its own control.

Thus, a redundant energy supply of the safety supply terminals 42, 44 can be achieved to be able to ensure the actuation of the internal switching elements according to ASIL-D required for ensuring the non-reactive disconnection of the individual sub-batteries 26, 28 as needed.

For example, a safety-relevant main power distributor is employed for the energy supply, which can distribute the electrical energy or electrical power to the safety supply terminals 42, 44 as well as the conventional supply terminal 46 starting from the two sub-batteries 26, 28. Therein, an ASIL-D composition with respect to the energy provision from the safety-relevant safety supply terminals 42, 44 with ASIL-x(D) and ASIL-D-x(D) can be decoupled from a required decomposition of the safety-relevant electrical devices 14 to be supplied, namely according to ASIL-y(D) and ASIL-D-y(D).

Overall, it can be provided that further potential distributors can optionally be employed in additional safety supply terminals as they have previously already been explained. With respect to the electrical devices 14 connected with the safety supply terminals, reference is made to the preceding explanations.

An optionally required closed current supply can be effected by an energy storage for example optimized in closed current like the supply battery 64, 66 or else by a supply battery 84 connected with the conventional supply terminal 46. With respect to the further characteristics of this circuit, it is additionally made reference to the preceding explanations.

From the preceding embodiments, it is apparent how an increased safety in the electrical energy supply of safety-relevant electrical devices in motor vehicles can be achieved or even be improved using a preset safety circuit structure.

The embodiments exclusively serve for explaining the invention and are not intended to restrict it.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A vehicle electrical system for a motor vehicle, the vehicle electrical system comprising:
   a partitioned energy storage comprising a vehicle battery, the vehicle battery comprising at least two sub-batteries, wherein the vehicle battery comprises one or more battery contactors to be able to protect the vehicle battery from dangerous operating states;
   at least one conventional supply terminal electrically coupled to the vehicle battery such that the vehicle battery to provide electrical energy at the at least one conventional supply terminal from more than one of the at least two sub-batteries;
   a coupling device connected to the vehicle battery; and
   at least a first and a second safety supply terminal decoupled from each other in terms of energy supply and connected to the coupling device, wherein the coupling device is configured to electrically couple the at least one first and second safety supply terminal each to one of the at least two sub-batteries based on a coupling state of the coupling device, wherein the coupling device is connected with the vehicle battery in uninterruptable manner.

2. The vehicle electrical system according to claim 1, comprising a first connection switching element electrically coupled with the first or the second safety supply terminal or with the at least one conventional supply terminal, the first connection switching element configured to electrically couple the respective first or second safety supply terminal to the conventional supply terminal based on a switching state of the first connection switching element.

3. The vehicle electrical system according to claim 1, wherein the coupling device comprises a power-distributing device electrically coupled with the at least two sub-batteries and which provides the at least one first and one second safety supply terminal as well as the at least one conventional supply terminal, wherein the power-distributing device comprises:
a coupling apparatus to electrically couple the terminals as well as one source switching element for each of the at least two sub-batteries, which is configured to electrically couple the respective sub-battery with the coupling apparatus based on a switching state, and
a supply switching element for each of the at least two safety supply terminals, which is configured to electrically couple the respective safety supply terminal with the coupling apparatus depending on a switching state.

4. The vehicle electrical system according to claim 2, wherein the coupling device comprises a power-distributing device electrically coupled with the at least two sub-batteries and which provides the at least one first and one second safety supply terminal as well as the at least one conventional supply terminal, wherein the power-distributing device comprises:
a coupling apparatus to electrically couple the terminals as well as one source switching element for each of the at least two sub-batteries, which is configured to electrically couple the respective sub-battery with the coupling apparatus based on a switching state, and
a supply switching element for each of the at least two safety supply terminals, which is configured to electrically couple the respective safety supply terminal with the coupling apparatus depending on a switching state.

5. The vehicle electrical system according to claim 1, comprising a second connection switching element electrically coupled with the first and the second safety supply terminal, which is configured to electrically couple the first and the second safety supply terminal based on a switching state of the second connection switching element.

6. The vehicle electrical system according to claim 2, comprising a second connection switching element electrically coupled with the first and the second safety supply terminal, which is configured to electrically couple the first and the second safety supply terminal based on a switching state of the second connection switching element.

7. The vehicle electrical system according to claim 1, wherein a supply terminal battery is connected with at least one of the at least two safety supply terminals.

8. The vehicle electrical system according to claim 1, wherein the coupling device comprises at least one energy converter, which electrically couples at least one of the safety supply terminals with the sub-battery.

9. The vehicle electrical system according to claim 8, wherein the at least one energy converter is separately electrically connected with at least two sub-batteries.

10. A motor vehicle with a vehicle electrical system configured according to claim 1.

11. A motor vehicle with a vehicle electrical system configured according to claim 2.

12. A vehicle electrical system for a motor vehicle, the vehicle electrical system comprising:
a partitioned energy storage comprising a vehicle battery comprising at least two sub-batteries, wherein the vehicle battery comprises one or more battery contactors to be able to protect the vehicle battery from dangerous operating states;
at least one conventional supply terminal electrically coupled with the vehicle battery such that the vehicle battery provides electrical energy at the at least one conventional supply terminal from more than one of the at least two sub-batteries; and
a coupling device connected with the vehicle battery as well as at least a first and a second safety supply terminal, which are decoupled from each other in terms of energy supply and are connected with the coupling device,
wherein the coupling device comprises a third connection switching element and is configured to electrically couple the one first or second safety supply terminal with one of the at least two sub-batteries based on a coupling state of the coupling device, and to electrically couple the respectively at least one other of the safety supply terminals with the conventional supply terminal via the third connection switching element based on a switching state of the third connection switching element, and
wherein the coupling device is connected with the vehicle battery in uninterruptable manner.

13. The vehicle electrical system according to claim 12, wherein a supply terminal battery is connected with at least one of the at least two safety supply terminals.

14. The vehicle electrical system according to claim 12, wherein the coupling device comprises at least one energy converter, which electrically couples at least one of the safety supply terminals with the sub-battery.

15. The vehicle electrical system according to claim 14, wherein the at least one energy converter is separately electrically connected with at least two sub-batteries.

16. A motor vehicle with a vehicle electrical system configured according to claim 12.

17. A method for operating a vehicle electrical system for a motor vehicle, comprising:
providing electrical energy from a partitioned energy storage comprising more than one of at least two sub-batteries of a vehicle battery of the vehicle electrical system at a conventional supply terminal of the vehicle electrical system electrically coupled with the vehicle battery, wherein the vehicle battery comprises one or more battery contactors to be able to protect the vehicle battery from dangerous operating states;
supplying at least a first and a second safety supply terminal of the vehicle electrical system with electrical energy via a coupling device of the vehicle electrical system connected with the vehicle battery, the first and second safety supply terminal decoupled from each other in terms of energy supply; and
electrically coupling, by the coupling device, the at least one first and second safety supply terminal each with one of the at least two sub-batteries based on a coupling state of the coupling device, wherein the coupling device is connected with the vehicle battery in uninterruptable manner.

18. A method for operating a vehicle electrical system for a motor vehicle, comprising:

providing electrical energy from a partitioned energy storage comprising more than one of at least two sub-batteries of a vehicle battery of the vehicle electrical system at a conventional supply terminal of the vehicle electrical system electrically coupled with the vehicle battery, wherein the vehicle battery comprises one or more battery contactors to be able to protect the vehicle battery from dangerous operating states;

supplying at least a first and a second safety supply terminal of the vehicle electrical system with electrical energy via a coupling device of the vehicle electrical system connected with the vehicle battery, the first and second safety supply terminal decoupled from each other in terms of energy supply;

electrically coupling, by the coupling device, the first or the second safety supply terminal to one of the at least two sub-batteries based on a coupling state of the coupling device; and electrically coupling, by the coupling device, the respectively at least one other of the safety supply terminals with the conventional supply terminal via a third connection switching element of the coupling device based on a switching state of the third connection switching element, wherein the coupling device is connected with the vehicle battery in uninterruptable manner.

<div align="center">*   *   *   *   *</div>